Dec. 1, 1964

B. A. WILSON 3,159,250

STRUCTURAL MEMBER

Filed Feb. 5, 1962

INVENTOR.
Bertram Arnold Wilson
BY
Ralph Hanney
Attorney

United States Patent Office 3,159,250
Patented Dec. 1, 1964

3,159,250
STRUCTURAL MEMBER
Bertram Arnold Wilson, 2001 Peninsula Drive, Erie, Pa.
Filed Feb. 5, 1962, Ser. No. 171,134
3 Claims. (Cl. 189—41)

This invention is a structural member to which screw threaded attachment may be made at any point along its length. The member has a plurality of outwardly facing, longitudinal slots or grooves in the opposed surfaces of which are longitudinal ribs of screw thread formation and spacing. From one aspect, the ribs are interrupted threads which engage diametrically opposite sides of the screw. Because the ribs extend the full length of the slots or grooves, fastening is possible at any point along the length.

Figure 1:
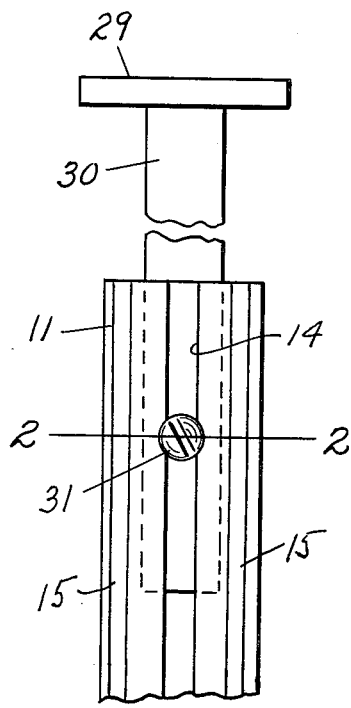
Figure 2:
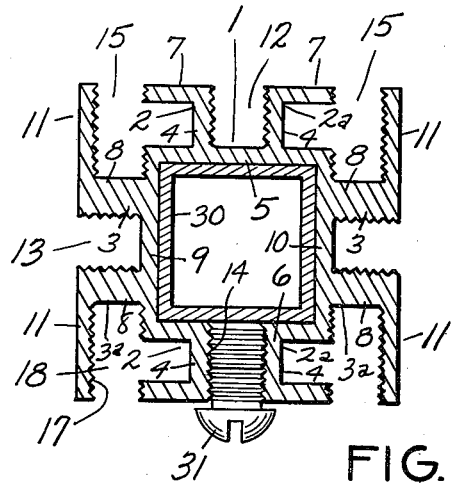
Figure 3:
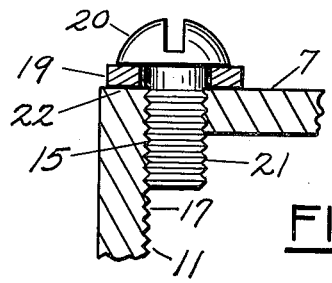
Figure 4:
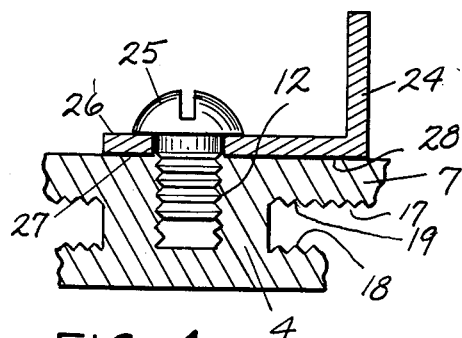

In the accompanying drawing, FIG. 1 is an elevation of a structural member, FIG. 2 is a section on line 2—2 of FIG. 1, FIG. 3 is a fragmentary section illustrating one possible screw connection, and FIG. 4 is a fragmentary section illustrating another possible screw connection.

The structural member may be easily made from extruded aluminum and comprises a center tubular section 1 of square or other suitable cross section having on each of the outer surfaces thereof a pair of integral longitudinal angles 2, 2a and 3, 3a. The angles 2, 2a have outwardly extending flanges 4 perpendicular to the wall sections 5 and 6 and flanges 7 extending away from each other and parallel to the walls 5 and 6 and with outer edges in substantial alignment with wall sections 9 or 10. The angles 3, 3a have flanges 8 extending outwardly perpendicular to the wall sections 9 and 10 and flanges 11 which extend away from each other and respectively parallel to the walls 9 and 10. The flanges 11 are in overlapping relation but spaced from the outer edges of the flanges 7. The combination of tubular section 1 and the angles results in a rigid structural member.

On the outer surface of each of the walls 5 and 6 is a groove 12 formed by a pair of flanges 4. There is a similar groove 13 on the outer surface of each of the walls 9 and 10 formed by a pair of flanges 8. The bottom of the groove on the wall 6 has a longitudinally extending slot 14 of the same spacing as the flanges 4. On opposite sides of the grooves 12 are slots 15 respectively formed between the outer edge of one of the flanges 7 and the inner surface of one of the flanges 11.

For the purpose of making screw fastenings to the structural member, longitudinal ribs 17 of screw thread formation and of spacing corresponding to the screw pitch are formed in opposed surfaces of each of the groves 12, 13 and of each of the slots 15. For example, the ribs 17 are extruded on opposed surfaces of the outwardly extending flanges 4 which form the grooves 12 and similar ribs are extruded on opposed surfaces of the outwardly extending flanges 8 which form the grooves 13. Similarly, ribs 17 are extruded on the opposed surfaces of the flanges 11 and of the flanges 7 and the walls 9 and 10. The ribs are easily formed during the extruding operation. These ribs extend parallel to the longitudinal axes of the structural member. It will be noted that the crests 18 of the ribs on one side of each groove or slot are opposite the roots 19 of the ribs on the opposite side of the groove or slot or, in other words, the ribs 17 on opposite sides of each groove or slot are displaced from each other half the pitch of a screw thread. A screw of the pitch corresponding to the ribs 17 may be screwed into any point along the length of the grooves and slots 12, 13, 15. In the particular construction illustrated, the grooves 12, 13 are spaced for a larger screw than the slots 15, but that is not necessary. The spacing of adjacent flanges forming the grooves and slots 12, 13, 15 is substantially the pitch diameter of the screw intended to be received in the groove or slot.

FIG. 3 illustrates a screw fastening to one of the slots 15. A plate 19 is clamped between the head 20 of screw 21 and the adjacent surfaces 22 of the slot 15. When the screw is pulled up tight, a rigid connection results. While the ribs 17 are from one aspect interrupted screw threads, adequate engagement with the threads of the screw 21 is obtained. Since the threads provided by the ribs 17 are interrupted, it would also be possible to have the threads on the screw 21 interrupted. For example, opposite sides of the screw 21 might have flats of spacing less than the spacing between the creasts 18 of the ribs 17 in which case the screw connection could be made by inserting the screw with the flats parallel to the crests 18 of the ribs and then turning the screw a quarter turn to bring the interrupted threads of the screw into engagement with the interrupted threads in the slot. This would require the use of special screws.

FIG. 4 shows a screw connection made to one of the grooves 12. An angle 24 is fastened by a screw 25. The side 26 of the angle is clamped solidly against the underlying surfaces 27 and 28, thereby making a rigid connection.

When the structural member is used as a supporting pole for office partitions, book shelves, lamps, displays and the like, it is necessary that the pole be solidly clamped between the floor and ceiling. This is very easy with the present construction due to the tubular center section 1. A foot 29 for engagement with either the floor or ceiling, as the case may be, is mounted at the outer end of a spindle 30 which telescopes within the tubular section 1. The spindle 30 may be made of any convenient length. From six to eight inches is ample for the variations in floor to ceiling height usually encountered. After the pole is moved into position, the spindle at either the upper or lower end is extended out until the pole is firmly anchored. A set screw 31 extending through the slot 14 fixes the spindle 30 in adjusted position. This eliminates the need for cutting the posts to exact length. It is also advantageous for poles which must be moved from place to place.

What is claimed as new is:

1. A structural member having a square tubular center section and a pair of longitudinally extending integral angles on each side of the center section, the individual pairs of angles having longitudinal flanges integral with and extending outward from the associated side of the center section and spaced from each other substantially the pitch diameter of a screw and further having other longitudinal flanges extending away from each other and spaced from said associated side substantially the pitch diameter of a screw, said other flanges on two opposite sides of the center section overlapping the edges of the other flanges on the adjacent sides of the center section and spaced from said edges substantially the pitch diameter of a screw, said angles providing eight longitudinally extending slots each having on the opposed surfaces thereof longitudinal ribs of screw thread formation and spacing whereby a screw may be screwed into each slot at any point along the length of the slot to form a screw threaded attachment.

2. A structural member having a polygonal tubular center section, polygonal outer sides spaced outwardly from the sides of the center section and with each outer side formed by a pair of longitudinally extending angles with spaced integral flanges extending outwardly from the adjacent sides of the center section and in opposed relation to each other and with other flanges spaced from and extending parallel to the adjacent side of the center section, adjacent flanges being spaced substantially the pitch diameter of a screw and having on the opposed surfaces thereof longitudinal ribs of screw thread formation and spacing whereby a screw may be screwed between said adjacent flanges at any point along the length to form a screw threaded attachment.

3. A floor to ceiling pole having a tubular center section with a first longitudinal slot therein and a plurality of longitudinal flanges joined to said center section and peripherally disposed about the center section with adjacent flanges spaced from each other to provide other longitudinally extending slots, a foot for engaging the floor or ceiling having a spindle telescoped into said center section, opposed surfaces of said first slot being spaced substantially the pitch diameter of a screw and having on the opposed surfaces thereof longitudinal ribs of screw thread formation and spacing whereby a screw may be screwed into the slot to lock the spindle; and fastening means extending through said other slots cooperating with said flanges for connecting parts thereto.

References Cited in the file of this patent
UNITED STATES PATENTS

| | | |
|---|---|---|
| Re. 24,133 | Bloedow | Mar. 20, 1956 |
| 576,279 | Schleese | Feb. 2, 1897 |
| 3,072,226 | Harwood | Jan. 8, 1963 |
| 3,086,627 | Bernard | Apr. 23, 1963 |

OTHER REFERENCES

German application 1,101,865, published Mar. 9, 1961